(12) United States Patent
Pigott et al.

(10) Patent No.: US 11,118,865 B2
(45) Date of Patent: Sep. 14, 2021

(54) AMMUNITION FOR ENGAGING UNMANNED AERIAL SYSTEMS

(71) Applicant: P2K Technologies LLC, Orlando, FL (US)

(72) Inventors: Dane Stephens Pigott, Oldsmar, FL (US); Westin Riggs Pigott, Carmel, IN (US); Babak Hossein Keradman, St. Petersburg, FL (US)

(73) Assignee: P2K Technologies LLC, Orlando, FL (US)

( * ) Notice: Subject to any disclaimer, the term of this patent is extended or adjusted under 35 U.S.C. 154(b) by 0 days.

(21) Appl. No.: 16/817,485

(22) Filed: Mar. 12, 2020

(65) Prior Publication Data

US 2020/0363176 A1 Nov. 19, 2020

Related U.S. Application Data

(60) Provisional application No. 62/817,272, filed on Mar. 12, 2019.

(51) Int. Cl.
*F42B 5/28* (2006.01)
*F42B 12/64* (2006.01)
*F42C 9/10* (2006.01)
*F41G 1/46* (2006.01)
*F41G 11/00* (2006.01)
*F41G 3/16* (2006.01)
*F41G 3/08* (2006.01)

(52) U.S. Cl.
CPC ............... *F41G 1/46* (2013.01); *F41G 3/08* (2013.01); *F41G 3/165* (2013.01); *F41G 11/001* (2013.01); *F42B 5/28* (2013.01); *F42B 12/64* (2013.01); *F42C 9/10* (2013.01)

(58) Field of Classification Search
CPC .......... F42B 12/56; F42B 12/58; F42B 12/60; F42B 12/62; F42B 12/64; F42C 9/10
See application file for complete search history.

(56) References Cited

U.S. PATENT DOCUMENTS

| | | | | | |
|---|---|---|---|---|---|
| 3,724,378 | A | * | 4/1973 | Knight | F42B 12/64 |
| | | | | | 102/456 |
| 6,129,024 | A | * | 10/2000 | Gerber | F42B 12/28 |
| | | | | | 102/521 |
| 8,250,987 | B1 | * | 8/2012 | Morley | F42B 10/48 |
| | | | | | 102/506 |
| 9,212,876 | B1 | * | 12/2015 | Kostka | F42B 8/14 |
| 9,273,943 | B1 | * | 3/2016 | Poulsen | F42B 10/00 |
| 9,778,004 | B2 | * | 10/2017 | Rumfitt | F42B 12/48 |
| 2020/0208951 | A1 | * | 7/2020 | Allison | F42C 9/10 |

FOREIGN PATENT DOCUMENTS

| | | | | | |
|---|---|---|---|---|---|
| FR | 334377 | A | * | 12/1903 | F42B 12/64 |
| FR | 804400 | A | * | 10/1936 | F42B 12/60 |
| GB | 105098 | A | * | 3/1917 | F42B 12/64 |
| GB | 249765 | A | * | 4/1926 | F42B 12/60 |

* cited by examiner

*Primary Examiner* — Gabriel J. Klein
(74) *Attorney, Agent, or Firm* — Stanton IP Law Firm, P.A.

(57) ABSTRACT

The invention relates to a disintegrating bullet that breaks apart at set distances in order to better engage targets such as unmanned aerial systems.

10 Claims, 12 Drawing Sheets

AMMUNITION FOR ENGAGING UNMANNED AERIAL SYSTEMS

CROSS-REFERENCE TO RELATED APPLICATION

This application claims priority from U.S. Provisional Patent Application No. 62/817,272, filed Mar. 12, 2019, titled DETERRENT FOR UNMANNED AERIAL SYSTEMS which is hereby incorporated by reference herein for all purposes.

COPYRIGHT STATEMENT

Trademarks used in the disclosure of the invention and the applicants make no claim to any trademarks referenced.

BACKGROUND OF THE INVENTION

1) Field of the Invention

The invention relates to a disintegrating bullet that breaks apart at set distances in order to better engage targets such as unmanned aerial systems.

2) Description of Related Art

An unmanned or radio-controlled vehicle is a machine controlled remotely by an operator using a radio transmitter that wirelessly communicates with a receiver on the vehicle to control its movements and/or other functions. Some unmanned vehicles are referred to as "drones." There are various types of drones commonly grouped by their medium of travel, such as unmanned aerial vehicles (UAVs) or aerial drones, unmanned terrestrial vehicles (UTVs) or ground drones, and unmanned marine vehicles (UMVs) or aquatic drones. Small unmanned aerial vehicles (sUAS) which are small unmanned aerial vehicles defined by the FAA as weighing less than 55 pounds. Aerial drones are presently the most common type of drones in use and may operate with varying degrees of autonomy or may be remotely piloted by a human operator. Aerial drones typically can carry various types of payloads. In some cases, drones are designed to be expendable.

UAS and drones are an increasing threat to the United States Military. Foreign militaries and non-state actors (terrorist groups, insurgents, cartels etc.) have successfully utilized cheap and prevalent consumer grade drones in actions against the US and our allies. Drones have been used for surveillance, artillery spotting, harassment, and attack. The US military was somewhat caught off guard by the rapid adoption of Unmanned Aircraft System (UAS) by our adversaries. Traditionally, Air Defense has consisted of defending against large enemy aircraft and was traditionally a task accomplished at high echelons (meaning that most ground forces have no organic ability to defend against air attack). Because of the proliferation of small Unmanned Aircraft System (sUAS), units at all levels need to be able to defend themselves from attack. The US and other militaries and civilian groups are spending a large amount of money to defend against sUAS, however these technologies are expensive, long term, and not likely to benefit all military units due to cost and the resources required to employ them. Additionally, these systems require the unit to carry additional weapons to counteract the UAS threat.

It is well understood that a firearm cannot consistently hit a target, even when that target is lined up with the weapon's sighting system, without adjusting for external conditions referred to as ballistics such as bullet drop, target velocity, range to target, bullet flight time, wind, bullet shape and weight, air pressure, temperature, spindrift, angle to the target (called "cosine angle"), either up or downhill and others. The ballistics are simpler when the distances are shorter and most shooters who engage in short to regular ranges usually only have to adjust their sights to compensate for gravity. One way the prior art has simplified the problem for aerial targets is to utilize shotgun ammunition which exits the rifle and spreads out in a pattern to compensate for the lack of accuracy of the fired projectile. Typical shotgun shell ammunition have been developed to overcome accuracy issues.

Shotshells conventionally include a hull or shell containing propellant, a wad, and a load. Typically, the load is a plurality of shots or pellets. Shotshells have also been made with a single slug. This allows a shooter to fire a large, single projectile from a shotgun. More recently, shotshells have been made with sabots which improve performance of slugs from shotguns. Shot is desirable because the dispersion of multiple projectiles allows for more aim error, particularly for moving targets. A slug is desirable for deep penetration and large energy deposit on a target. Shot is desirable because it is easier to get at least some shot on the target, causing some damage; slugs are desirable because they can cause significant damage to the target. However, the problem of hitting aerial targets and causing significant damage to destroy the aerial object is still present and the ability to hit objects that are at a greater distance than that of a shotgun. Also, utilizing a shotgun requires the warfighter to carry an additional weapon than their standard issue rife. Therefore, there remains a need for increase range because a typical shotgun shot has a maximum range of 30-50 meters and slugs have a maximum effective range of 100 meter.

Therefore, there is a need for a simple defensive weapon system capable of being fired from rifles carried by the military such as M16 and M4, and machine guns such as M249, M240 and M2, which are standard issue weapons for all U.S. military troops, as well as foreign or civilian weapons.

BRIEF SUMMARY OF THE INVENTION

The invention in one form is directed to a device capable of replacing existing ammunition, which consists of a standard bullet and case/cartridge profile, and is usable in a wide variety of weapons systems such as M16 and M4, machines guns such as M249, M240 and M2, and is configured to break apart at set distances in order to better engage targets such as unmanned aerial systems.

The device of the instant invention is a type of bullet/projectile, ballistic rounds to be fired from firearms that breaks apart at set distances in order to better engage targets such as unmanned aerial systems.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION

Figure 1:
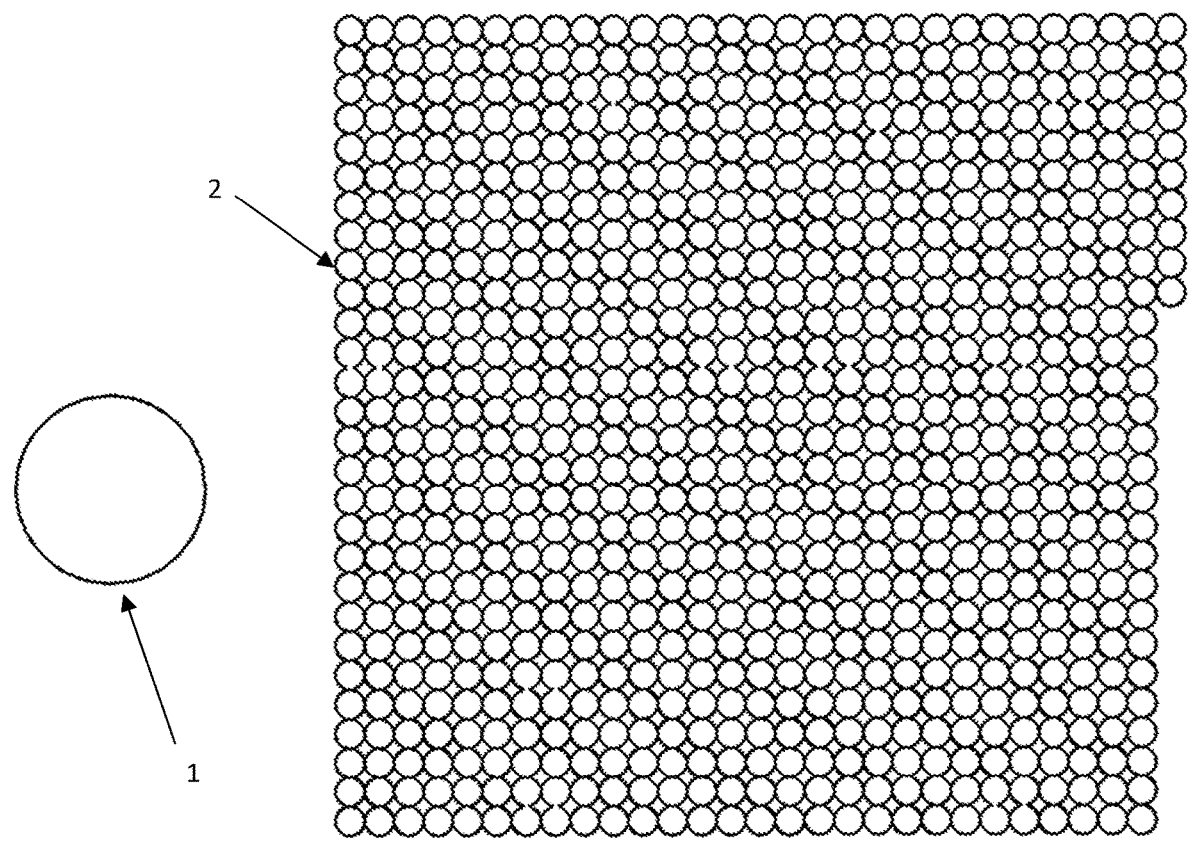
FIG. 1 shows an example of a standard M2 machine gun or Browning .50 caliber machine gun round compared to a 12-gauge shotgun round.

The term user, individual, shooter, war fighter and person as used in this specification are used interchangeably to mean an individual using the bullet/ballistic round/projectile of the instant invention. The term sUAS, UAS, UAVs, UTVs, and UMVs as used in this specification are used interchangeably to mean Unmanned Aerial Systems.

The term bullet, ballistic round, round, projectile as used in this specification includes any ballistic projectile and the terms are used interchangeably.

The invention in one form is directed to a device capable of replacing existing ammunition which consists of a standard bullet and case/cartridge profile and is usable in a wide variety of weapons systems such as M16 and M4, machines guns such as M249, M240 and M2 and is configured to break apart at set distances in order to better engage targets such as unmanned aerial systems.

The device of the instant invention is a type of bullet to be fired from firearms that breaks apart at set distances in order to better engage targets such as unmanned aerial systems.

The bullet is constructed so that when it fires, it initially has a shape and ballistic profile similar to standard ammunition (such as jacketed hollow point). This allows the bullet to follow a standard ballistic flight path towards the target.

The bullet, like standard bullets, has a spin imparted on it by the rifling in the gun barrel. After a set period of time, which is correlated with a set distance, the bullet fragments or breaks into multiple pieces.

The set period of time is controlled by the timing system, which resides within the bullet and consists of a fuse type material which burns at a known rate. This could also be a chemical reaction which occurs at a known rate. By adjusting the length, volume, chemistry, or other parameters of the timing system, the bursting charge or center rod is activated/burned/dissolved at a certain time. The set period of time is related (by the muzzle velocity of the projectile) to a distance down range from the weapon.

When the timing system is in use, rounds would generally be linked together or placed in a magazine, such that rounds bursting at different distances would be intermixed, giving a large area of effects. The operator of the weapon does not have to set time or distance. The rounds exit the weapon and activate/explode at a set time/distance, with multiple rounds exploding at their prescribed distance during the course of firing.

The method for breaking the bullet apart can be either by imparting a force such as an explosion or gas pressure from a chemical reaction, or by removing a component which is resistant to the centripetal forces pulling on the bullet. This is accomplished via burning, dissolution, or some other method of removing the exterior or interior support of the bullet.

When the bullet fragments, the pieces of the bullet are scattered tangentially to the flight path by centripetal force imparted by the spinning of the bullet and the force from expanding gas or both, and move towards the target in an expanding field so that the probability of intercepting the target is increased.

The multiple parts of the bullet increase the chance of hitting a target by increasing the proportion of the airspace which contains bullet pieces. This can be thought of as how much space the cross section of a bullet occupies in a plane tangential to the flight path. A bullet of the instant invention described here can also have a tangential cross section up to dozens of times larger than a unitary bullet.

Referring to FIG. 1 shows an example of a standard M2 machine gun round or Browning .50 caliber machine gun round compared to a round of the invention. When comparing the two, the M2 machine gun payload 1 has a potential cross-sectional area of 131.02 mm$^2$ and a round of the invention payload 2 has a potential cross-sectional area of 3329.4 mm$^2$. This represents an increase in cross sectional area of 25.4 times which increases the potential of contacting the moving target such as a sUAS. The problem is not solved with a shot gun round because it begins the expanding process after it leaves the muzzle which limits the effective distance of the round.

Figure 2:
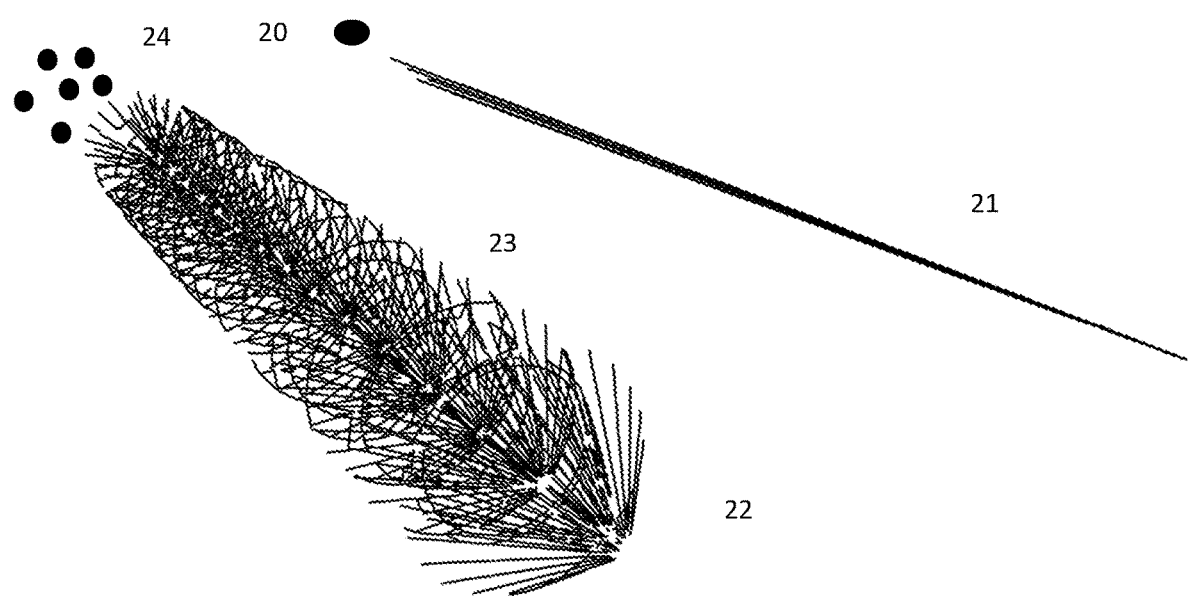
FIG. 2 shows the spread of the flight paths of a traditional bullet versus the bullet of the invention.

Referring to FIG. 2 Figure showing spread of the flight paths of bullets 20 and 22. A grouping of standards bullets 20 is shown by flight path 21 and it shows the slight variation in flight path due to shooter inaccuracies, recoil, and atmospheric conditions, however, the bullets all generally fly along the same flight path and so only have effects on a small area through the space. A group of bullets as described in the invention 22 and having the flight path 23 break apart at multiple points along the flight path 23, (showing only some points) and results in fragmented projectiles represented by 24. The component parts and payload of the bullets spread out while continuing forward flight. This causes the bullet and its components to occupy a far greater amount of space, and dramatically increase the chances of hitting a target in that space. One should note that this is a simplified representation of the actual condition and does not account for the wide variety of ballistic metrics such as ballistic drop along the flight paths. Also, it does not show that the ballistic round flies as a unitary ballistic round then breaks apart at a predetermined distance from the muzzle of the gun unlike a shotgun shell.

As the bullet 24 parts fly away from the split point, they rapidly lose kinetic energy. This loss is caused by the bullet parts' non aerodynamic design as well as the reduced mass of each component. The reduction in kinetic energy makes the bullet safer for persons or equipment which is under the bullet.

Critical to the design of the ballistic round of the instant invention is the explosive material which releases chemical energy such as: nitroglycerin, 2,4,6-trinitrotoluene (TNT), HMX also called octogen, a powerful and relatively insensitive nitroamine high explosive, Pentaerythritol tetranitrate (PETN), nitrocellulose, a highly flammable compound formed by nitrating cellulose through exposure to nitric acid or another powerful nitrating agent. As used in the preferred embodiment, nitrocellulose is the primary choice. When used as a propellant or low-order explosive, it was originally known as guncotton. Any of these materials can be used as an accelerant for the center rod, timing charge or to the busting charge of the instant invention. The center rod may be made of a foamed explosive element such as foamed RDX. This process casts the explosive as well as stabilizing agents and plasticizers in a mold along with an inert gas. The gas forms bubbles in the center of the explosive, reducing weight, while the sides maintain strength.

Combustible materials for the busting charge, timing charge and the center rod include: RDX, nitroglycerin, 2,4,6-trinitrotoluene (TNT), wax, lacquer, HMX also called octogen, Pentaerythritol tetranitrate (PETN), nitrocellulose, zinc, copper, silver, aluminum, or alloys to provide stable and predictable characteristics or cotton, linen, silk, wood and paper, and can be formed into a shape and form that can support combustion and provide a fuse. Alternatively, the design could use a Visco fuse which is the simplest form of a fuse consisting of the burning core of black powder coated with one or more overwraps made of textile. The outer layers of the Visco fuse are coated with wax or lacquer which make it durable and water resistant.

Dissolvable materials include materials such as sugar and salt bearing materials. These could also include metals, alloys, plastics that chemically react to dissolve in the presence of certain gasses, acids or other liquids that can be introduced by the timing charge.

Figure 3:
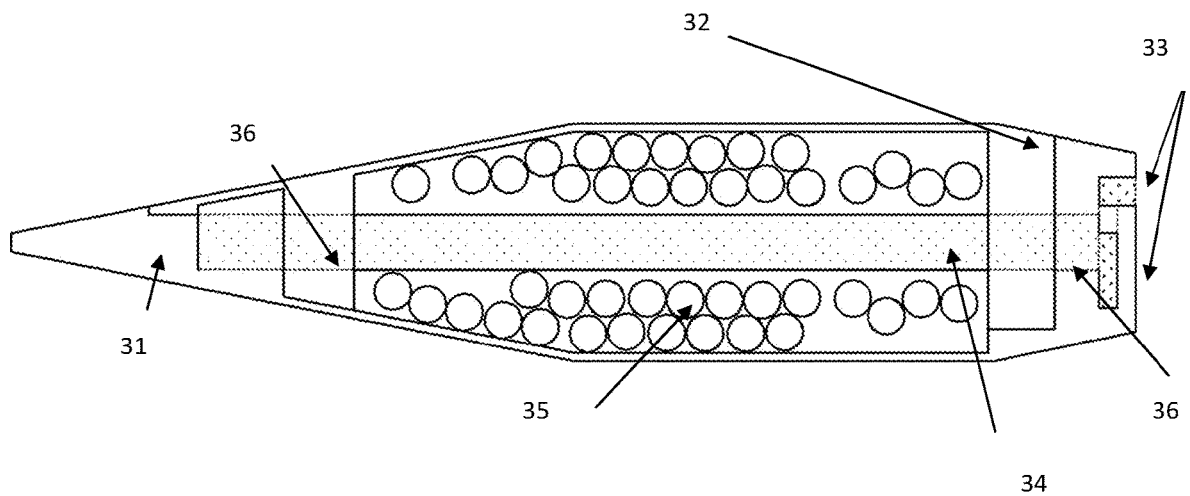
FIG. 3 shows a first embodiment the bullet/ballistic round/projectile of the instant invention in an unfired configuration.

Referring to FIG. 3 is shown a first embodiment of the bullet/ballistic round/projectile of the instant invention in an unfired configuration. The bullet/ballistic round consists of two or more casings 31 and 32 that are held together by a combustible, explosive, or dissolvable center rod 34 which passes through holes in the cases 36 at one or more points and payload 35. The resistance to shear forces by the center rod holds the round together when fired. This center rod may or may not be coated or surrounded by a jacket or support. A timing charge 33 at the rear of the bullet/ballistic round projectile is ignited by the explosion of gun powder when the round is fired. Alternately the timing system can consist of chemicals which mix due to the G-forces imparted on the bullet during firing. When the timing charge has been consumed, it ignites or dissolves the center rod which then is consumed; the ballistic round will fragment due to the centripetal energy force of the bullet/ballistic round.

The bullet is capable of being fired from a rifle that breaks apart at predetermined distances from the muzzle of said rifle to engage aerial targets and it has at least two casings which can be identified as a top casing and a bottom casing and these casings having holes to receive a center rod. The bullet contains a timing charge which times the consumption of the center rod which when the center rod is fully consumed it releases the payload of the bullet.

The casing can be made for brass, copper, aluminum, ceramic or steel.

Typical explosive materials which can be used in the design of the bullet of the instant invention include gun powder, nitroglycerin, TNT, HMX, RDX and PSTN.

Figure 4:
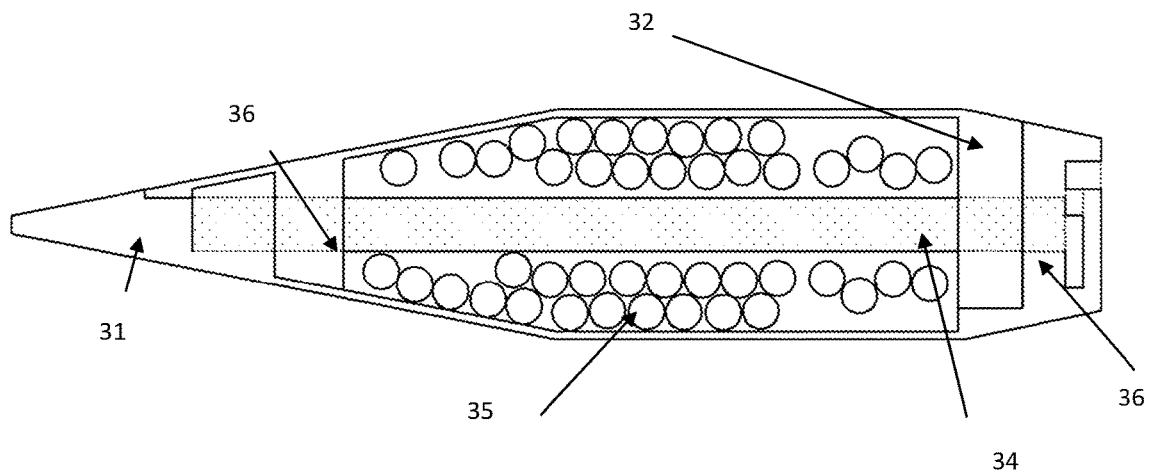
FIG. 4 shows the bullet/ballistic round of the instant invention after the timing system has completed its timing by consuming timing charge.

Referring to FIG. 4, the bullet/ballistic round after the timing system has completed its timing, by consuming timing charge 33, ignites the center rod 34 formed from a Visco fuse material (it could be any explosive material).

The ignition of the center rod 34, burns, causing it to incinerate, after a prescribed amount of time which correlates to a predetermined distance based on time to consume the center rod and the velocity of the ballistic round. The time is variable by changing the composition, size, or length of the timing material and the material of the center rod. At the appropriate time, the timing system will cause the center rod 34 to be consumed.

Figure 5:
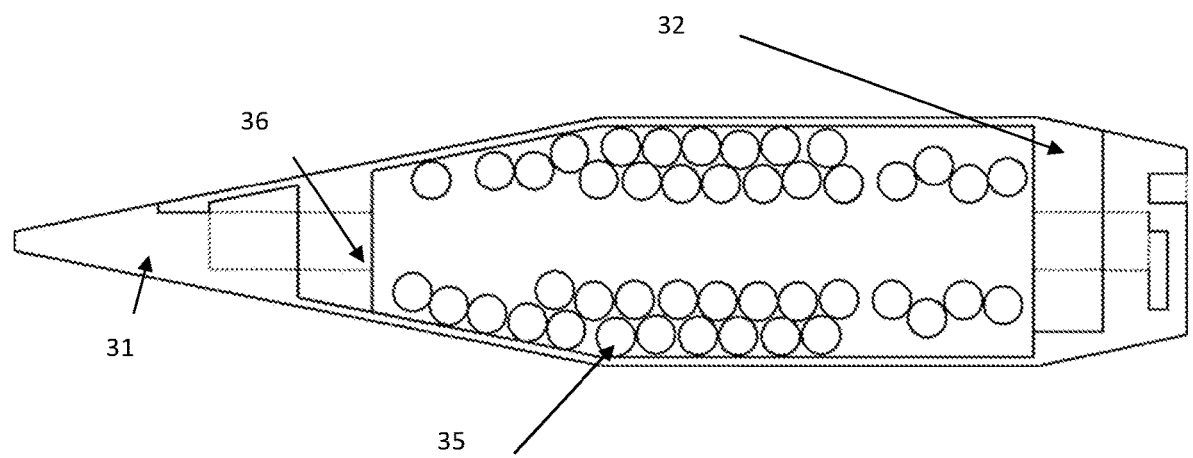
FIG. 5 shows the bullet/ballistic round of the instant invention after the center rod has been burned, dissolved, or exploded away initiating the process of fragmentation.
Figure 6:
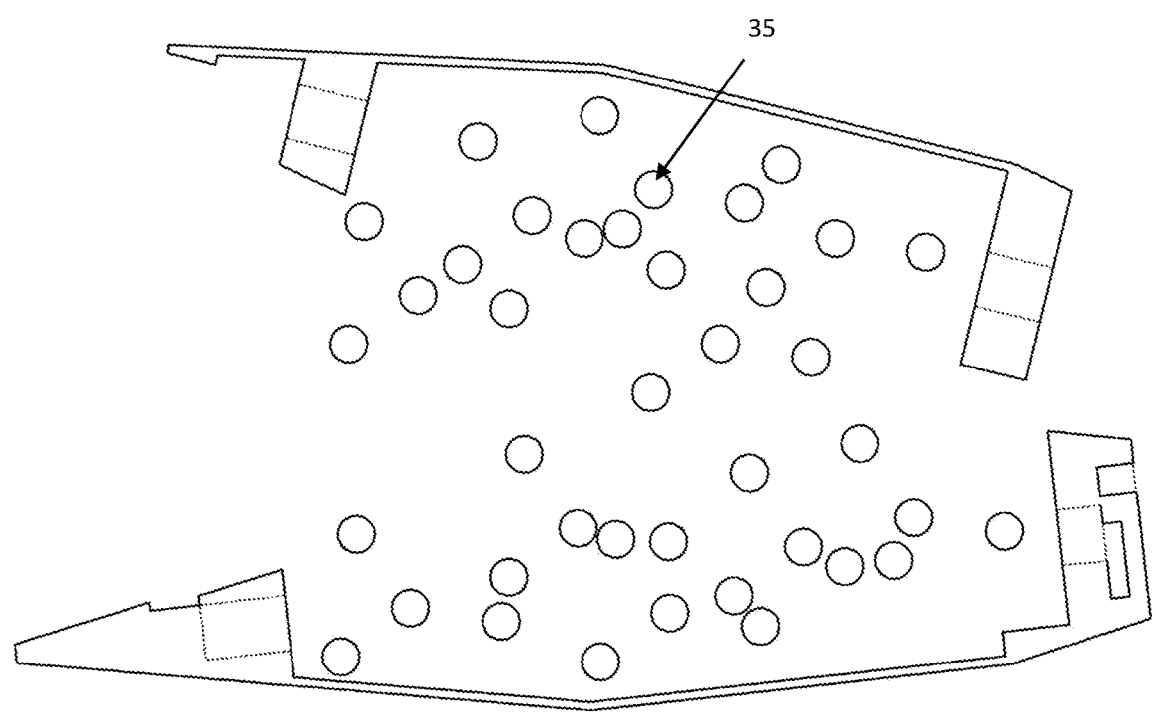
FIG. 6 shows the bullet/ballistic round of the instant invention after the center rod has been burned, dissolved, or exploded away and shows the fragmentation process.

Referring to FIG. 5 and FIG. 6 is shown the bullet/ballistic round after the center rod has been burned, dissolved, or exploded away initiating the process of fragmentation. Once the center rod has been consumed, the pieces of the casing 31 and 32 are no longer held together by the center rod at the shear points 36. As shown in FIG. 6 the bullet/ballistic round casing, separates or fragments, and the centripetal force pulling on the bullet is no longer resisted by the center rod 84 in the case eyelets, and pulls the bullet casings apart. Therefore, when the casing is fragmented by the consumption of the center rod and the rod is effectively removed, the fragmented casing releases the payload and the payload can expand beyond the bullet diameter by way of centripetal force. In addition to the centripetal forces, the potential gas pressure built up by the destruction of the center rod 34 can create overpressure, further pushing (fragmenting) the case apart. This releases the payload 35 which is pulled away from the ballistic flight path of the bullet by centripetal force. The payload could be steel, iron, lead or other material and formed as balls or shot, cubes, ribbons, or some other shape which is designed to maximize the destruction of the target.

Figure 7:
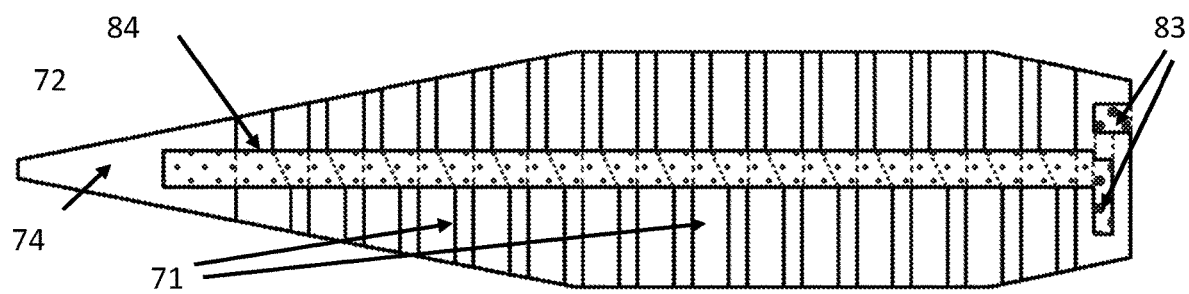
FIG. 7 shows a second embodiment the bullet/ballistic round/projectile of the instant invention in an unfired configuration.

Referring to FIG. 7 is shown a second embodiment of the bullet/ballistic round/projectile of the instant invention in an unfired configuration. The bullet is composed primarily of disk-shaped objects (ballistic disks) 71 of varying sizes stacked such that they make the shape of the bullet. The disks have a hole in the center through which passes a center rod of combustible, burnable, or dissolvable material 84. This center rod holds the disks in alignment and resists the centripetal forces which try to pull the disks apart. The disks may also have a glue or binding agent between them. The bullet has a cap 74 into which the center rod is secured either mechanically or with glue. A timing charge 83 at the rear of the bullet/ballistic round projectile is ignited by the explosion of gun powder when the round is fired. The timing system can consist of any of the following materials such as nitroglycerin, 2,4,6-trinitrotoluene (TNT), wax, lacquer, HMX also called octogen, Pentaerythritol tetranitrate (PETN), nitrocellulose, zinc, copper, silver, aluminum, or alloys to provide stable and predictable characteristics or cotton, linen, silk, Visco fuse, wood and paper. Alternately, the timing system can also consist of chemicals which mix due to the G-forces imparted on the bullet during firing.

Figure 8:
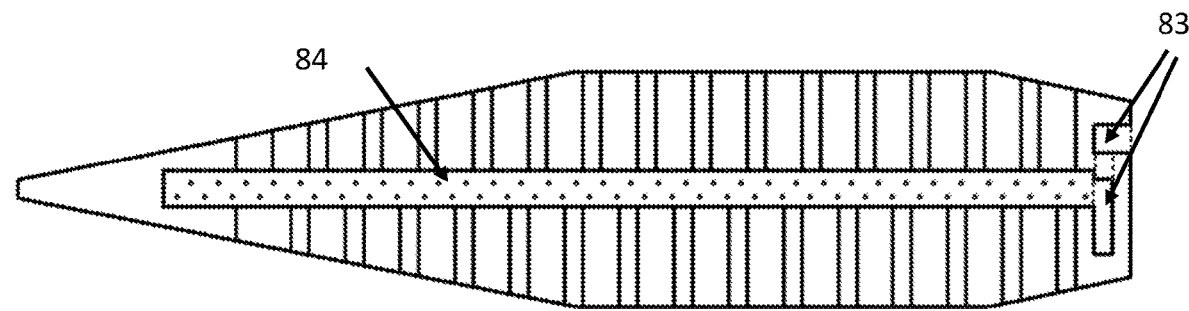
FIG. 8 shows the second embodiment the bullet/ballistic of the instant invention showing the bullet after the timing system has activated.

Referring to FIG. 8 is shown a second embodiment the bullet/ballistic showing the bullet after the timing system has activated. The bullet/ballistic round after the timing system has completed its timing by consuming timing charge 83 which ignites the center rod 84 formed from a Visco fuse material which is a preferred configuration. Alternatively, the center od can also be formed from nitroglycerin, 2,4,6-trinitrotoluene (TNT), wax, lacquer, HMX also called octogen, Pentaerythritol tetranitrate (PETN), nitrocellulose, zinc, copper, silver, aluminum, or alloys to provide stable and predictable characteristics or cotton, linen, silk, Visco fuse, wood and paper.

The Visco fuse material forming center rod 84 is consumed after a prescribed amount of time. The center rod could alternatively be made of a material which would react with chemicals which would create a reaction which either detonates, burns, or dissolves the center rod 84. The time is variable by changing the composition, size, or length of the timing material. At the appropriate time, the timing system will cause the center rod 84 formed in the preferred example of Visco fuse material to burn. However, one could use any of the following materials such as nitroglycerin, 2,4,6-trinitrotoluene (TNT), wax, lacquer, HMX also called octogen, Pentaerythritol tetranitrate (PETN), nitrocellulose, zinc, copper, silver, aluminum, or alloys to provide stable and predictable characteristics or cotton, linen, silk, Visco fuse, wood and paper center rod. The ignition of the center rod 84, burns, causing it to incinerate after a prescribed amount of time. The time is variable by changing the composition, size, or length of the timing material and the material of the center rod. At the appropriate time, the timing system will cause the center rod 84 to be consumed which allows the ballistic round to fragment and the ballistic disks 71 spread apart resulting in a wider path of the payload to intercept the target.

Figure 9:
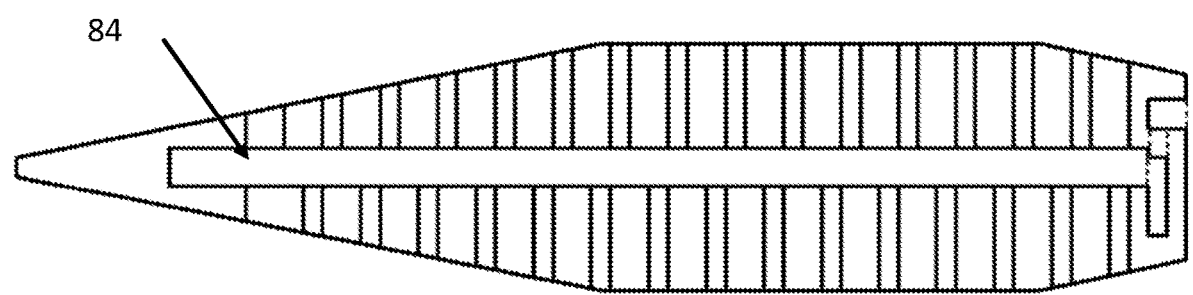
FIG. 9 shows the second embodiment bullet/ballistic of the instant invention showing the bullet after the timing system has been consumed.
Figure 10:
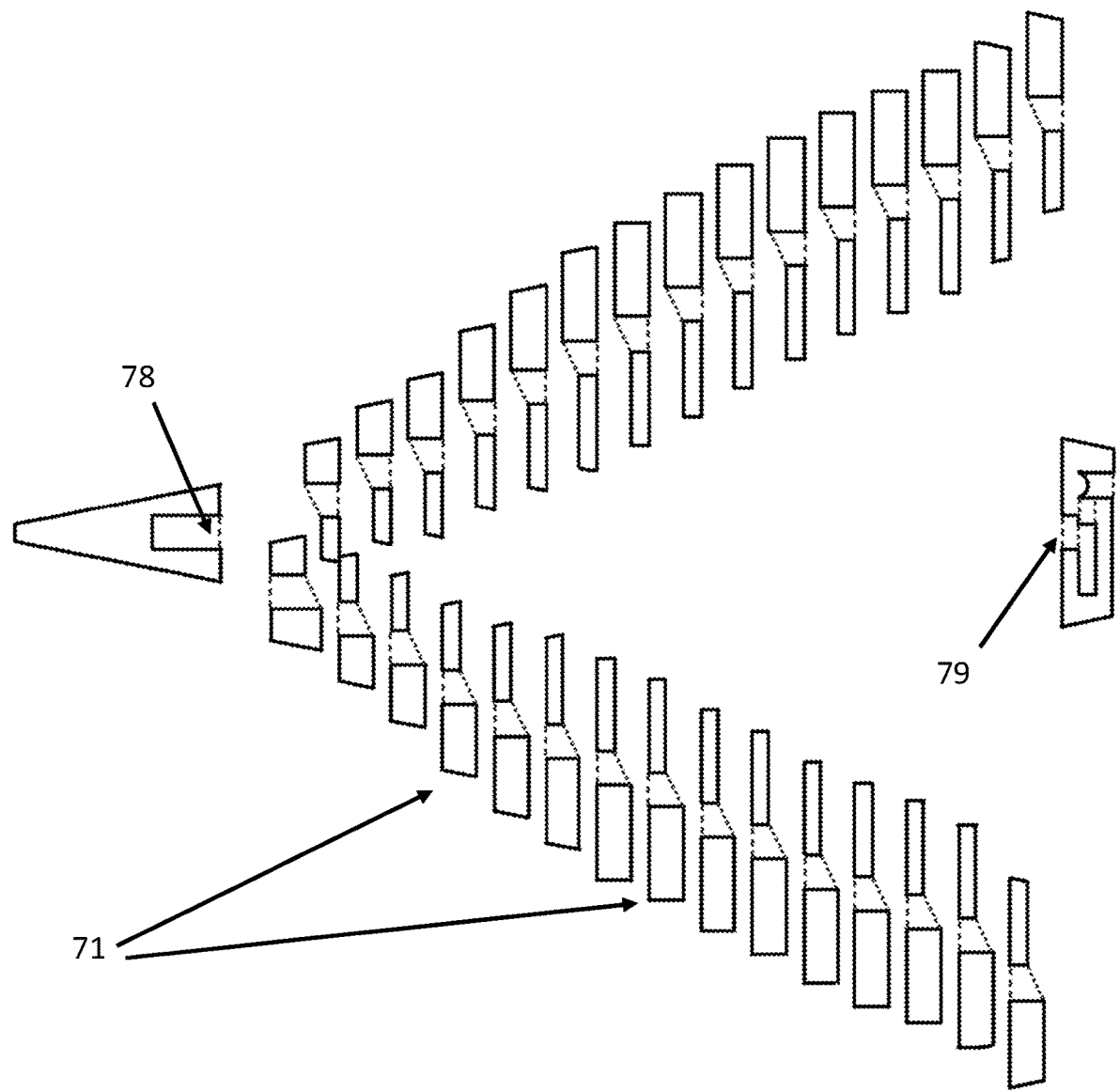
FIG. 10 shows the second embodiment bullet/ballistic of the instant invention showing the disks spread out to create more area of effect than a unitary bullet.

Referring to FIG. 9 is shown a second embodiment, the bullet/ballistic round projectile showing the bullet after the timing system has been consumed. Once the center rod has been removed, the ballistic disks 71 are no longer held together by the center rod and centripetal force causes the ballistic disks to accelerate tangentially to the ballistic flight path. These ballistic disks 71 spread out and create more area of effect than a unitary bullet could as shown in FIG. 10.

Figure 11:
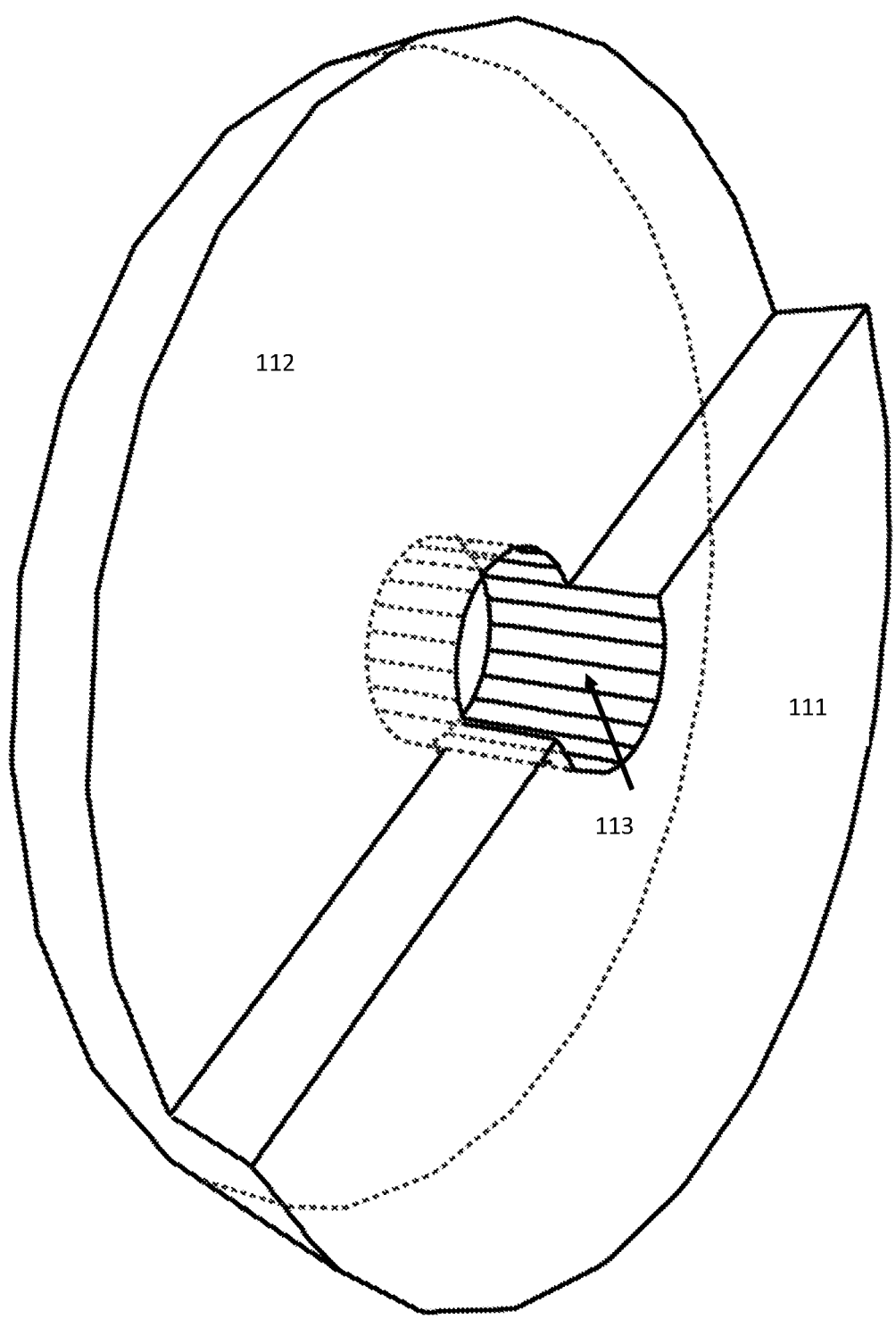
FIG. 11 shows a ballistic disk of the second embodiment bullet/ballistic of the instant invention.

Referring to FIG. 11 is shown a view of a ballistic disk 71 used in the FIG. 7. The shape of the ballistic disk 71 is lopsided, with one side 111 having more mass than the other 112, causing the centripetal forces acting on the ballistic disk 71 to pull it away in the direction of the more massive side. This mass imbalance can be achieved by either volumetric or material differences within the disk. A volumetric difference is shown in the figure, with one side being of thicker construction than the other. However, the ballistic disk 71 could be made from differing material fused at the centerline of the disk. Each material would have a different specific gravity which would result in a different mass of the semicircular segment of the disk. The bullet is held together by a center rod through holes 113 in the various disks and holes in the casing 78 and 79. When complete, the bullet's weight and center of gravity is balanced, ensuring an accurate flight path.

Figure 12:
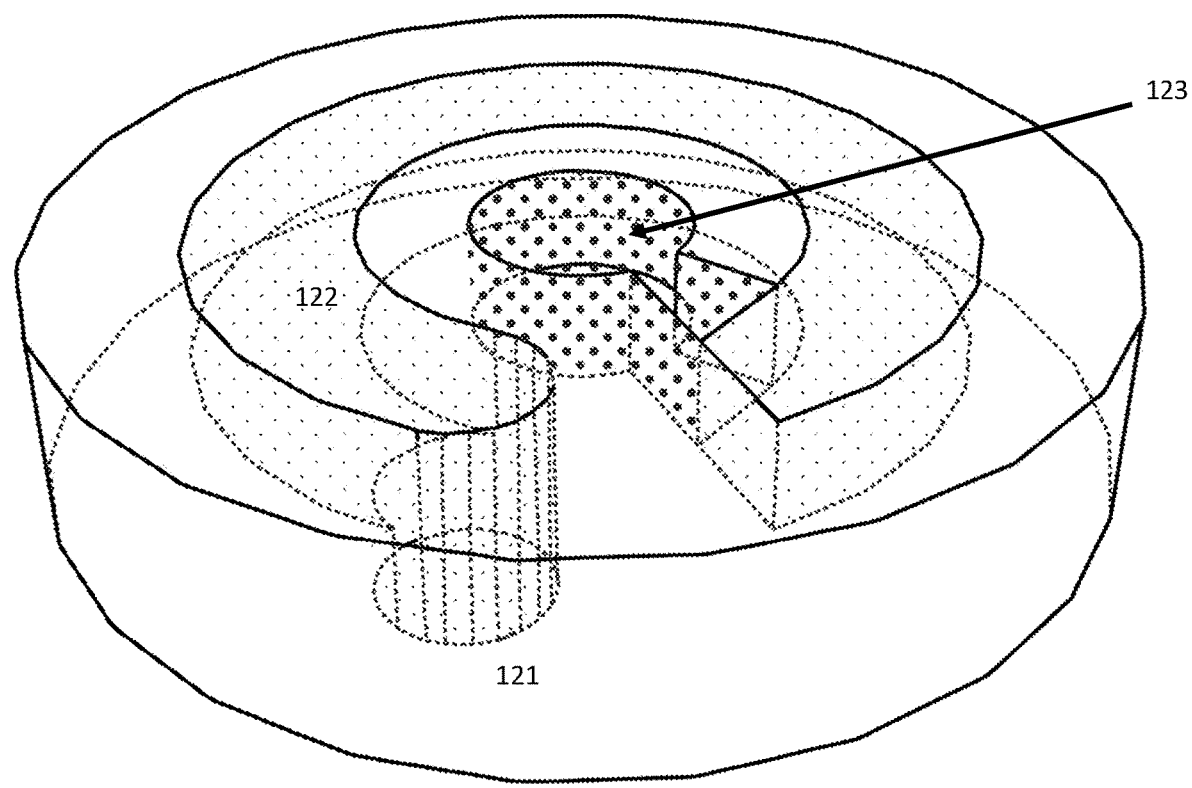
FIG. 12 shows a view of the timing system combustible of the second embodiment bullet/ballistic of the instant invention.

Referring to FIG. 12 is a view of timing system combustible. The system is contained in the base of the bullet. A hole 121 allows burning powder from the bullet's cartridge to contact the timing charge 122. This charge is a material which combusts at a known rate. The length of material is varied to produce differing times. When the timing charge burns completely away, it lights the center rod or bursting charge 123.

Figure 13:
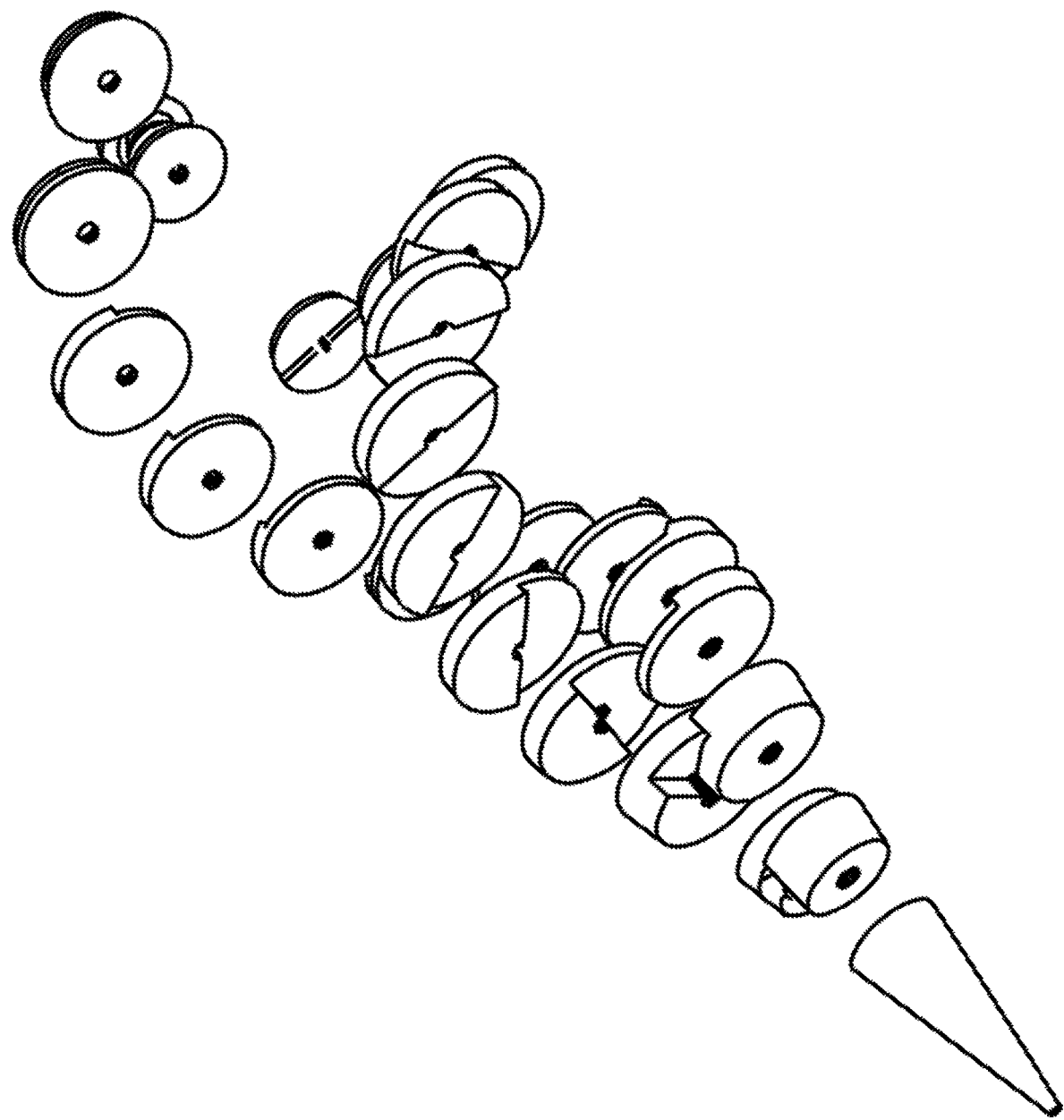
FIG. 13 shows a 3-dimensional view of ballistic disks of the second embodiment bullet/ballistic of the instant invention separating in flight due to centripetal forces after the removal of the center rod.

Referring to FIG. 13 is a 3-dimensional view of ballistic disks separating in flight due to centripetal forces after the removal of the center rod system.

Figure 14:
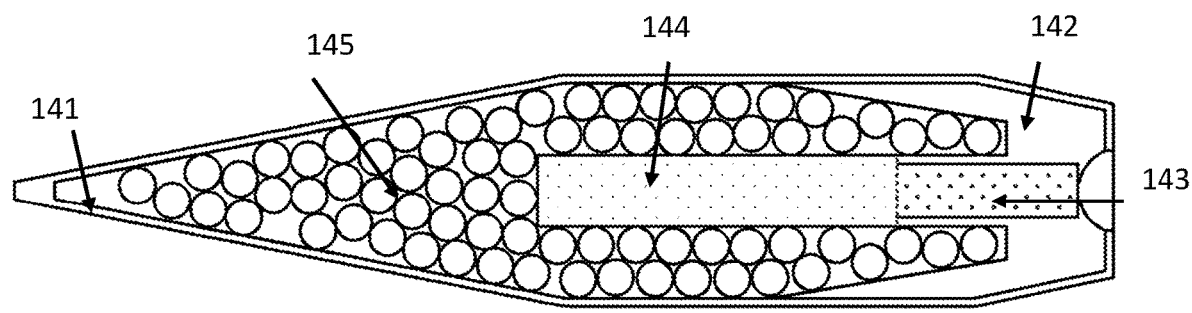
FIG. 14 shows a third embodiment of the bullet of the instant invention.

Referring to FIG. 14 is a third embodiment of the bullet of the instant invention. The bullet consists of an outer case 141, base 142, timing system 143, bursting charge 144, and payload 145. When the bullet is fired, the timing system is activated either by the gunpowder in the cartridge or by g-forces acting on the bullet. The preferred embodiment of FIG. 14 the timing system is Visco fuse material.

Figure 15:
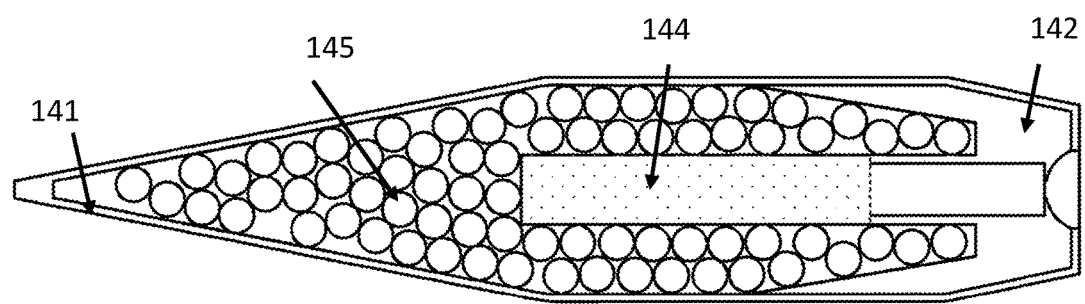
FIG. 15 shows the third embodiment of the bullet of the instant invention timing system that activates the bursting charge.

Referring to FIG. 15 after the prescribed amount of time the bullet in FIG. 14, the timing system activates the bursting charge. This charge is either explosive material or other gas pressure producing material.

The bursting charge material can be selected from the group consisting of nitroglycerin, 2,4,6-trinitrotoluene (TNT), wax, lacquer, HMX, Pentaerythritol tetranitrate, nitrocellulose, zinc, copper, silver, Visco fuse and aluminum.

Figure 16:
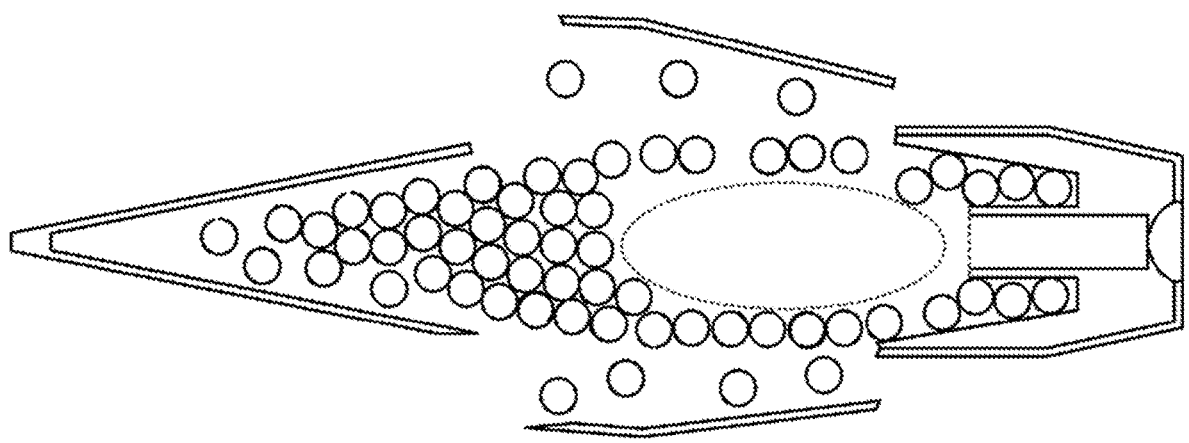
FIG. 16 shows the third embodiment of the bullet of the instant invention bursting charge the bullet that creates over pressure in the case and bursts it.

Referring to FIG. 16 the bursting charge 144 of the bullet in FIG. 14 creates over pressure in the case 141 and bursts it. The gas pressure, as well as unbalanced centripetal forces acting on the individual payload items cause them to scatter tangentially to the ballistic flight path of the bullet.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

We claim:

1. A bullet capable of being fired from a rifle that breaks apart at a predetermined distance from the muzzle of said rifle to engage aerial targets comprising: at least two casings including a top casing and a bottom casing and said top casing and bottom casing having holes to receive a center Visco fuse; at least one payload; a timing charge; said center Visco fuse passing through said holes in said top casing and bottom casing to hold the casing together; said top casing and bottom casing are fragmented by centripetal force when said center Visco fuse is removed and the fragmented top casing and bottom casing releases said payload.

2. The bullet of claim 1 wherein a material for said top casing and bottom casing is selected from the group consisting of brass, copper, aluminum, ceramic and steel.

3. The bullet of claim 1 wherein a material for said timing charge is selected from the group consisting of nitroglycerin, 2,4,6-trinitrotoluene, HMX, Pentaerythritol tetranitrate (PETN) and nitrocellulose.

4. The bullet of claim 1 wherein a material for said payload is selected from the group consisting of steel, iron and lead.

5. A bullet capable of being fired from a rifle that breaks apart at a predetermined distance from the muzzle of said rifle to engage aerial targets comprising: at least two casings including a top casing and a bottom casing and said top casing and bottom casing having holes to receive a center Visco fuse; at least one payload formed from disks; a timing charge; said center Visco fuse passing through said disks and the holes in said top casing and bottom casing to hold the casing and disks together; said top casing and bottom casings are fragmented when said center Visco fuse is removed and the fragmented casing releases said payload by centripetal force.

6. The bullet of claim 5 wherein a material for said top casing and bottom casing is selected from the group consisting of brass, copper, aluminum, ceramic and steel.

7. The bullet of claim 5 wherein a material for said timing charge is selected from the group consisting of nitroglycerin, 2,4,6-trinitrotoluene, HMX, Pentaerythritol tetranitrate (PETN) and nitrocellulose.

8. The bullet of claim 5 wherein a material for said payload is selected from the group consisting of steel, iron and lead.

9. The bullet of claim 5 wherein each disk has a center hole to receive said center Visco fuse.

10. The bullet of claim 5 wherein each disk is lopsided, with one side having more mass than the other.

* * * * *